(12) United States Patent
Kim et al.

(10) Patent No.: US 10,290,859 B2
(45) Date of Patent: May 14, 2019

(54) METHOD OF PREPARING COMPOSITION FOR FORMING POSITIVE ELECTRODE OF LITHIUM SECONDARY BATTERY, AND POSITIVE ELECTRODE AND LITHIUM SECONDARY BATTERY MANUFACTURED BY USING THE COMPOSITION

(71) Applicant: LG Chem, Ltd., Seoul (KR)

(72) Inventors: Ji Yeon Kim, Daejeon (KR); Taek Soo Lee, Daejeon (KR); Jun Soo Park, Daejeon (KR); Sang Hoon Choy, Daejeon (KR)

(73) Assignee: LG Chem, Ltd. (KR)

( * ) Notice: Subject to any disclaimer, the term of this patent is extended or adjusted under 35 U.S.C. 154(b) by 22 days.

(21) Appl. No.: 15/538,042

(22) PCT Filed: Jan. 13, 2016

(86) PCT No.: PCT/KR2016/000359
§ 371 (c)(1),
(2) Date: Jun. 20, 2017

(87) PCT Pub. No.: WO2016/114589
PCT Pub. Date: Jul. 21, 2016

(65) Prior Publication Data
US 2017/0338468 A1 Nov. 23, 2017

(30) Foreign Application Priority Data

Jan. 13, 2015 (KR) .................. 10-2015-0005960
Jan. 12, 2016 (KR) .................. 10-2016-0003822

(51) Int. Cl.
*H01M 4/04* (2006.01)
*H01M 4/62* (2006.01)
(Continued)

(52) U.S. Cl.
CPC ......... *H01M 4/139* (2013.01); *H01M 4/0404* (2013.01); *H01M 4/623* (2013.01); *H01M 4/624* (2013.01); *H01M 10/0525* (2013.01)

(58) Field of Classification Search
CPC .................................................. H01M 4/139
See application file for complete search history.

(56) References Cited

U.S. PATENT DOCUMENTS

| 2003/0049529 A1 | 3/2003 | Cho et al. |
| 2009/0053602 A1 | 2/2009 | Sakitani et al. |
| (Continued) | | |

FOREIGN PATENT DOCUMENTS

| JP | H07201316 A | 8/1995 |
| JP | H10199507 A | 7/1998 |
| (Continued) | | |

OTHER PUBLICATIONS

Search report from International Application No. PCT/KR2016/000359, dated Apr. 21, 2016.

*Primary Examiner* — Matthew J Merkling
(74) *Attorney, Agent, or Firm* — Lerner, David, Littenberg, Krumholz & Mentlik, LLP

(57) ABSTRACT

Provided are a method of preparing a composition for forming a positive electrode of a lithium secondary battery which includes preparing a first dispersed solution by primary dispersion of a conductive agent and a dispersant in a solvent, preparing a second dispersed solution by adding binder powder to the first dispersed solution and performing secondary dispersion, and adding and mixing a positive electrode active material to the second dispersed solution, and a positive electrode and a lithium secondary battery which are prepared by using the composition.

A composition for forming a positive electrode of a lithium secondary battery, which has improved dispersibility, may be prepared by the above method, and internal resistance of the battery may be reduced and output characteristics may be improved when a positive electrode is prepared by using the composition.

16 Claims, 7 Drawing Sheets

(51) Int. Cl.
*H01M 4/139* (2010.01)
*H01M 10/0525* (2010.01)

(56) References Cited

U.S. PATENT DOCUMENTS

| | | |
|---|---|---|
| 2009/0267028 A1 | 10/2009 | Hoshiba |
| 2010/0075229 A1 | 3/2010 | Atsuki et al. |
| 2011/0159172 A1* | 6/2011 | Yamamoto ............ H01M 4/139 427/77 |
| 2011/0159360 A1 | 6/2011 | Hirota et al. |
| 2013/0089780 A1 | 4/2013 | Uezono |
| 2015/0017529 A1 | 1/2015 | Koo et al. |

FOREIGN PATENT DOCUMENTS

| | | |
|---|---|---|
| JP | H10302799 A | 11/1998 |
| JP | 2002117834 A | 4/2002 |
| JP | 2009048921 A | 3/2009 |
| JP | 2010015904 A | 1/2010 |
| JP | 2012009276 A | 1/2012 |
| JP | 2013084397 A | 5/2013 |
| JP | 2013089346 A | 5/2013 |
| JP | 2013180900 A | 9/2013 |
| JP | 2014160651 A | 9/2014 |
| JP | 2014535136 A | 12/2014 |
| KR | 100441513 B1 | 7/2004 |
| KR | 20080105133 A | 12/2008 |
| KR | 20100015324 A | 2/2010 |
| KR | 20110040766 A | 4/2011 |
| KR | 101103198 B1 | 1/2012 |
| WO | 2013085498 A1 | 6/2013 |
| WO | 2014148287 A1 | 9/2014 |

\* cited by examiner

METHOD OF PREPARING COMPOSITION FOR FORMING POSITIVE ELECTRODE OF LITHIUM SECONDARY BATTERY, AND POSITIVE ELECTRODE AND LITHIUM SECONDARY BATTERY MANUFACTURED BY USING THE COMPOSITION

CROSS-REFERENCE TO RELATED APPLICATIONS

The present application is a national phase entry under 35 U.S.C. § 371 of International Application No. PCT/KR2016/000359 filed Jan. 13, 2016, which claims priority to Korean Patent Application Nos. 10-2015-0005960, filed on Jan. 13, 2015, and 10-2016-0003822, filed on Jan. 12, 2016, the disclosures of which are incorporated herein in its entirety by reference.

TECHNICAL FIELD

The present invention relates to a method of preparing a composition for forming a positive electrode of a lithium secondary battery, and a positive electrode and a lithium secondary battery manufactured by using the composition.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

In a lithium secondary battery, a positive electrode is prepared by coating a positive electrode collector with a composition for forming a positive electrode, which is prepared by collectively mixing a positive electrode active material, a conductive agent, and a binder in a solvent, and then drying the coated positive electrode collector.

However, since the positive electrode active material and the conductive agent are typically used in the form of powder, miscibility with the solvent is low when the positive electrode active material and the conductive agent are collectively added to the solvent and mixed, and thus, the positive electrode active material and the conductive agent may be non-uniformly dispersed in the composition. In a case in which a positive electrode active material layer is formed by coating the positive electrode collector with the composition for forming a positive electrode in which components, such as the positive electrode active material and the conductive agent, are non-uniformly dispersed as described above, uniform coating on the positive electrode collector is difficult, and, as a result, the positive electrode active material layer having low thickness uniformity or surface defects is formed to reduce battery performance and lifetime characteristics.

Also, with respect to the conductive agent used in the preparation of the composition for forming a positive electrode, since the conductive agent is typically fine particles of a few tens of nanometers (nm), cohesion is strong, and thus, agglomeration of the fine conductive agent particles may easily occur when the conductive agent particles are dispersed in the solvent. Accordingly, the non-uniform dispersion of the conductive agent in the composition for forming a positive electrode is facilitated, and as a result, conductivity in the positive electrode active material layer becomes insufficient.

Furthermore, in a case in which non-uniform dispersion of the binder in the composition for forming a positive electrode occurs, non-uniformity in adhesive strength of the positive electrode active material layer with respect to the positive electrode collector may occur during the preparation of the positive electrode, and as a result, the positive electrode active material layer may be separated from the positive electrode collector and exfoliated. In this case, the exfoliation may not only significantly reduce the battery performance itself, but also may be a cause of reducing the lifetime characteristics of the battery.

Thus, uniform dispersion of the components in the composition for forming a positive electrode as well as the development of battery components having excellent characteristics is important to improve the battery performance and lifetime characteristics.

DISCLOSURE OF THE INVENTION

Technical Problem

An aspect of the present invention provides a method of preparing a composition for forming a positive electrode of a lithium secondary battery, which may not only reduce internal resistance of the battery and improve output characteristics through the improvement of the dispersion of the composition for forming a positive electrode, but may also improve adhesion over the entire electrode, and a composition for forming a positive electrode of a lithium secondary battery which is prepared by using the method.

Another aspect of the present invention provides a positive electrode for a lithium secondary battery prepared by using the composition for forming a positive electrode which is prepared by the above-described method.

Another aspect of the present invention provides a lithium secondary battery, a battery module, and a battery pack which include the positive electrode.

Technical Solution

According to an aspect of the present invention, there is provided a method of preparing a composition for forming a positive electrode of a lithium secondary battery including: preparing a first dispersed solution by primary dispersion of a conductive agent and a dispersant in a solvent; preparing a second dispersed solution by adding binder powder to the first dispersed solution and performing secondary dispersion; and adding and mixing a positive electrode active material to the second dispersed solution.

According to another aspect of the present invention, there is provided a composition for forming a positive electrode of a lithium secondary battery which is prepared by the above-described method of preparing a composition for forming a positive electrode.

According to another aspect of the present invention, there is provided a positive electrode for a lithium secondary battery which is prepared by using the above-described composition for forming a positive electrode and includes a positive electrode active material, a conductive agent, binder powder, and a dispersant, wherein the binder powder is in point contact with the positive electrode active material and the conductive agent.

According to another aspect of the present invention, there is provided a lithium secondary battery, a battery module, and a battery pack which include the positive electrode.

Details of other embodiments of the present invention are included in the following detailed description.

Advantageous Effects

A composition for forming a positive electrode of a lithium secondary battery, in which dispersion of components of the composition for forming a positive electrode including a positive electrode active material, a conductive agent, and a binder is significantly improved, may be prepared by a preparation method according to the present invention, and during the preparation of the positive electrode, internal resistance of the battery may be reduced and output characteristics may be improved by using the composition. Also, adhesion between the binder and the active material as well as between the positive electrode and a positive electrode collector may be improved by allowing the binder to be uniformly dispersed in the positive electrode through the control of the binder.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
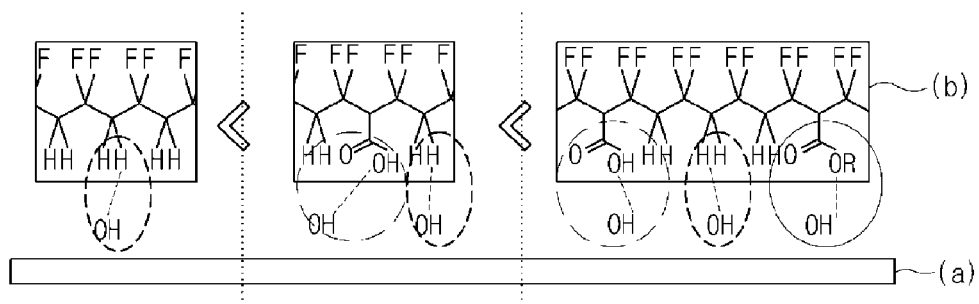
FIG. 1 is a schematic view illustrating a hydrogen bond between a binder and a surface of a positive electrode active material.

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

In general, during the preparation of a positive electrode, a slurry composition, which is prepared by mixing positive electrode active material and conductive agent powders with a liquid binder, has been used for the uniform dispersion of the binder in the composition for forming a positive electrode. However, in a case in which the binder is dissolved in a solvent and used as described above, the binder may surround outer surfaces of positive electrode active material and conductive agent particles. As a result, there is a limitation in that the positive electrode active material and the conductive agent present in a positive electrode active material layer are not sufficiently in contact with an electrolyte solution even if the prepared positive electrode is immersed in the electrolyte solution. The use of binder powder has been suggested to address the above limitation, but the binder powder is easy to be non-uniformly dispersed in the composition for forming a positive electrode, and, as a result, adhesion of the positive electrode active material layer to a positive electrode collector may be reduced and separation may occur.

In the present invention, during the preparation of a composition for forming a positive electrode which includes a positive electrode active material, a conductive agent, and a binder, binder powder is used to allow the binder to be in point contact with the positive electrode active material and conductive agent, and thus, typical reduction of battery characteristics, due to the prevention of the contact with the electrolyte solution caused by the binder surrounding the positive electrode active material and the conductive agent, may be prevented. Also, after the conductive agent having low dispersibility is first dispersed using a dispersant without the binder, the binder powder and the positive electrode active material are sequentially added and dispersed, and thus, dispersion of components in the composition for forming a positive electrode is increased. Accordingly, internal resistance of a battery may be reduced, output characteristics may be improved, and adhesion over the entire electrode may be improved.

That is, a method of preparing a composition for forming a positive electrode of a lithium secondary battery according to an embodiment of the present invention includes the steps of: preparing a first dispersed solution by primary dispersion of a conductive agent and a dispersant in a solvent (step 1); preparing a second dispersed solution by adding binder powder to the first dispersed solution and performing secondary dispersion (step 2); and adding and mixing a positive electrode active material to the second dispersed solution (step 3). Hereinafter, each step will be described in detail.

(Step 1)

In the method of preparing a composition for forming a positive electrode of a lithium secondary battery according to the embodiment of the present invention, step 1 is a step of first dispersing a conductive agent in a solvent using a dispersant.

In step 1, the conductive agent is used to provide conductivity to the positive electrode, wherein any conductive agent may be used without particular limitation as long as it has suitable electron conductivity without causing adverse chemical changes in the battery. Among these conductive agents, in consideration of an effect of improvement in battery characteristics, specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; acicular or rod-shaped conductive whiskers such as zinc oxide whiskers, calcium carbonate whiskers, titanium dioxide whiskers, silicon oxide whiskers, silicon carbide whiskers, aluminum borate whiskers, magnesium borate whiskers, potassium titanate whiskers, silicon nitride whiskers, and alumina whiskers; conductive metal oxides such as titanium oxide; or conductive polymers such as polyphenylene derivatives, and any one thereof or a mixture of two or more thereof may be used.

Also, the conductive agent may have an average particle diameter ($D_{50}$) of 10 nm to 50 nm. In a case in which the average particle diameter ($D_{50}$) of the conductive agent is less than 10 nm, dispersibility may be reduced due to the agglomeration of conductive agent particles, and, in a case in which the average particle diameter ($D_{50}$) of the conductive agent is greater than 50 nm, since the formation of a conductive path is not facilitated due to the reduction of specific surface area, conductivity in a positive electrode active material layer may be reduced. In consideration of a significant effect of the improvement in the battery characteristics due to the control of the particle diameter of the conductive agent, the conductive agent may have an average particle diameter ($D_{50}$) of 20 nm to nm. In the present invention, the average particle diameter ($D_{50}$) of the conductive agent may be defined as a particle diameter at 50% in a cumulative particle diameter distribution. For example, the average particle diameter ($D_{50}$) of the conductive agent may be measured by using a laser diffraction method. Specifically, the conductive agent is dispersed in a solution, the solution is introduced into a commercial laser diffraction particle size measurement instrument (e.g., Microtrac MT 3000) and irradiated with ultrasonic waves having a frequency of about 28 kHz and an output of 60 W, and the average particle diameter ($D_{50}$) at 50% in a cumulative particle diameter distribution of the measurement instrument may then be calculated.

Furthermore, the conductive agent may have a particle diameter of 60% to 80% of an average particle diameter ($D_{50}$) of the positive electrode active material under conditions satisfying the above-described average particle diameter range. In a case in which a difference between particle diameters of the conductive agent and the positive electrode active material is large during the preparation of the composition for forming a positive electrode, uniform dispersion of the conductive agent and the positive electrode active material in the composition for forming a positive electrode is difficult and the formation of the conductive path of the conductive agent in the positive electrode active material layer is not facilitated. Thus, excellent conductivity may be obtained when the conductive agent has a particle diameter of 60% to 80% of the average particle diameter ($D_{50}$) of the positive electrode active material within the above-described average particle diameter ($D_{50}$) range. In consideration of a significant effect due to the control of the difference between the particle diameters of the conductive agent and the positive electrode active material, the conductive agent may have a particle diameter of 60% to 70% of the average particle diameter ($D_{50}$) of the positive electrode active material under conditions satisfying the above-described average particle diameter range.

The specific surface area of the conductive agent may be in a range of 100 m$^2$/g to 1,000 m$^2$/g. A contact area with the positive electrode active material increases as the specific surface area of the conductive agent increases, and, as a result, the formation of the conductive path between positive electrode active material particles is facilitated. However, in a case in which the specific surface area is excessively large, specifically, greater than 1,000 m$^2$/g, energy density of the positive electrode may be reduced due to bulky structural characteristics. In contrast, in a case in which the specific surface area is excessively small, specifically, less than 100 m$^2$/g, the contact area with the positive electrode active material may be reduced and the agglomeration of the conductive agent may occur. In the present invention, the specific surface area of the conductive agent may be defined as a value (Brunauer-Emmett-Teller (BET) specific surface area) measured by a nitrogen adsorption method.

Also, the conductive agent may have an aspect ratio of greater than 1.

In the present invention, the aspect ratio represents a ratio of a length of a major axis passing through a center of the conductive agent particle to a length of a minor axis perpendicular to the major axis and passing through the center of the particle, i.e., a ratio of diameters (=length of the major axis/length of the minor axis), wherein the particle has a spherical shape when the aspect ratio is 1 and the particle has a fibrous shape when the aspect ratio is greater than 1. Since the conductive agent used in the present invention has a specific shape in which the aspect ratio is greater than 1, elasticity may be provided to a space between the particles and the conductive path in the positive electrode active material layer may be easily formed. If the aspect ratio of the conductive agent is 1 or less, since electron conductivity in a longitudinal direction of the conductive agent is insufficient, electrical conduction between the positive electrode active material particles may be difficult to be maintained, and, as a result, cycle characteristics may be reduced. Also, in consideration of a significant effect due to the use of the conductive agent having the specific shape, the conductive agent may have an aspect ratio of 1.2 to 200, for example, 1.2 to 20.

Specifically, in consideration of the significant effect of the improvement due to the use of the conductive agent and a high-temperature drying process during the preparation of the positive electrode, the conductive agent usable in the present invention may be the carbon-based material, may particularly be a rod-shaped carbon based material having an aspect ratio of greater than 1, and, for example, may include any one selected from the group consisting of carbon fibers, carbon nanotubes, and carbon nanorods having an aspect ratio of greater than 1, 1.2 to 200, or 1.2 to 20, or a mixture of two or more thereof Furthermore, the conductive agent may be used in an amount of 1 part by weight to 20 parts by weight based on 100 parts by weight of the positive electrode active material. In a case in which the amount of the conductive agent is less than 1 part by weight, the improvement in the conductivity due to the use of the conductive agent and the consequent effect of the improvement in the cycle characteristics may be insignificant, and, in a case in which the amount of the conductive agent is greater than 20 parts by weight, since the reaction of the conductive agent with the electrolyte solution may increase, the cycle characteristics of the battery may be reduced. In consideration of the significant effect of the improvement in the battery characteristics due to the control of the amount of the conductive agent having the above-described physical properties, the conductive agent, for example, may be used in an amount of 10 parts by weight to 20 parts by weight based on 100 parts by weight of the positive electrode active material.

The dispersant first dispersed with the above-described conductive agent functions to increase the dispersibility of the components in the composition for forming a positive electrode, particularly, the conductive agent. Also, the dispersant may also act as a thickener which appropriately controls viscosity of the composition for forming a positive electrode.

Any dispersant may be used without particular limitation as long as it is typically used in a composition for forming a positive electrode. Among these dispersants, in consideration of the effect of the improvement in the battery characteristics, specific examples of the dispersant may be a cellulose-based compound, polyalkylene oxide, polyvinyl alcohol, polyvinylpyrrolidone, polyvinyl acetal, polyvinyl ether, polyvinyl sulfonic acid, polyvinyl chloride (PVC), polyvinylidene fluoride, chitosans, starch, amylose, polyacrylamide, poly-N-isopropylacrylamide, poly-N—N-dimethylacrylamide, polyethyleneimine, polyoxyethylene, poly(2-methoxyethoxyethylene), poly(acrylamide-co-diaryldimethylammonium chloride), an acrylonitrile/butadiene/styrene (ABS) polymer, an acrylonitrile/styrene/acryl ester (ASA) polymer, a mixture of an acrylonitrile/styrene/acryl ester (ASA) polymer and propylene carbonate, a styrene/acrylonitrile (SAN) copolymer, or a methyl methacrylate/acrylonitrile/butadiene/styrene (MABS) polymer, and any one thereof or a mixture of two or more thereof may be used.

In the dispersant, the polyalkylene oxide may specifically include polyethylene oxide, polypropylene oxide, or a polyethylene oxide-polypropylene oxide copolymer.

Also, the cellulose-based compound may specifically include carboxymethyl cellulose, hydroxymethyl cellulose, hydroxyethyl cellulose, hydroxypropyl cellulose, alcohol-soluble cellulose butyrate, cellulose acetate, cellulose acetate butyrate, cellulose butyrate, cyanoethyl cellulose, methyl cellulose, ethyl cellulose, ethyl hydroxyethyl cellulose, nitrocellulose, sodium carboxymethyl cellulose, ammonium carboxymethyl cellulose, or hydroxypropyl methylcellulose.

Furthermore, in a case in which the dispersant is the cellulose-based compound, a weight-average molecular weight ($M_w$) of the cellulose-based compound may be in a range of 2,000,000 g/mol to 3,000,000 g/mol. In a case in which the $M_w$ of the cellulose-based compound is less than 2,000,000 g/mol, a dispersibility improvement effect may be insignificant, and, in a case in which the $M_w$ of the cellulose-based compound is greater than 3,000,000 g/mol, difficulties in processing may occur during the preparation of the composition for forming a positive electrode and capacity may decrease. In consideration of the significant effect of the improvement in the battery characteristics due to the control of the weight-average molecular weight of the cellulose-based compound as the dispersant, the cellulose-based compound may have a weight-average molecular weight ($M_w$) of 2,500,000 g/mol to 3,000,000 g/mol. In the present invention, the weight-average molecular weight ($M_w$) is a polystyrene-equivalent weight-average molecular weight measured by gel permeation chromatography (GPC).

For example, the dispersant may be carboxymethyl cellulose which satisfies the above-described weight-average molecular weight condition.

Also, the dispersant may be used in an amount of 0.1 part by weight to 10 parts by weight based on 100 parts by weight of the positive electrode active material. In a case in which the amount of the dispersant is less than 0.1 part by weight, the improvement effect due to the use of the dispersant may be insignificant, and, in a case in which the amount of the dispersant is greater than 10 parts by weight, since the amount of the conductive agent and the positive electrode active material may be relatively reduced due to the use of the excessive amount of the dispersant, the battery characteristics may be reduced. In consideration of the significant effect of the improvement in the battery characteristics due to the control of the amount of the dispersant as described above, the dispersant, for example, may be used in an amount of 5 parts by weight to 10 parts by weight based on 100 parts by weight of the positive electrode active material.

Furthermore, as the solvent for dispersing the conductive agent and the dispersant, any solvent may be used without particular limitation as long as it is typically used in a composition for forming a positive electrode. Specific examples of the solvent may be an aliphatic hydrocarbon-based solvent such as pentane, n-hexane, octane, cyclopentane, or cyclohexane; an aromatic hydrocarbon-based solvent such as benzene, toluene, or xylene; an aldehyde-based solvent such as furfural; a ketone-based solvent such as acetone, methylethylketone, cyclopentanone, or cyclohexanone; an ester-based solvent such as butyl acetate, ethyl acetate, methyl acetate, butyl propionate, ethylene glycol monoethyl ether acetate, propylene glycol monomethyl ether acetate, or 3-methoxybutyl acetate ethylene glycol diacetate; an ether-based solvent such as tetrahydrofuran, dioxane, or ethylene glycol dimethyl ether; an alcohol-based solvent such as methanol, ethanol, n-propyl alcohol, isopropyl alcohol, butyl alcohol, octyl alcohol, cyclohexanol, aryl alcohol, benzyl alcohol, cresol, or furfuryl alcohol; a polyol-based solvent such as glycerol, ethylene glycol, or diethylene glycol; an alcohol ether-based solvent such as ethylene glycol monomethyl ether, ethylene glycol monoethyl ether, ethylene glycol monobutyl ether, propylene glycol monomethyl ether, or diethylene glycol monobutyl ether; an aprotic polar solvent such as N-methyl-2-pyrrolidone, dimethyl sulfoxide, or dimethylformamide; or water, and any one thereof or a mixture of two or more thereof may be used.

The solvent is not only used as a dispersion medium for dispersing the conductive agent and the dispersant, but is also used as a solvent during the subsequent preparation of the composition for forming a positive electrode of a lithium secondary battery. Accordingly, in consideration of the dispersibility of the conductive agent and dispersant, coatability of the composition for forming a positive electrode, and processability, the solvent may be included in an amount to have an appropriate viscosity, for example, a viscosity of 1,000 cps to 5,000 cps. In the present invention, the viscosity is defined as a value measured using a BM-type viscometer (product of TOKIMEC INC.) at 25° C.

Also, a method of dispersing the above-described conductive agent and dispersant in the solvent in step 1 may be performed according to a typical mixing or dispersion method.

Specifically, the method may be performed by using a mixing or dispersing apparatus such as a homogenizer, bead mill, ball mill, basket mill, attrition mill, universal stirrer, clear mixer, or TK mixer. For example, the dispersion may be performed by jet stream. In a case in which a dispersion process is performed by using the jet stream, uniform dispersion of the above-described components in the solvent may be promoted.

Specifically, the primary dispersion may be performed by a multistage dispersion process having two or more stages. For example, the primary dispersion may include a twostage dispersion process, in which a first dispersion process is performed at a rotational speed of 1,000 rpm to 5,000 rpm and a second dispersion process is then performed at a rotational speed of 10,000 rpm to 25,000 rpm by jet stream, and, for example, the first dispersion process is performed at a rotational speed of 1,000 rpm to 5,000 rpm for 30 minutes to 1 hour and the second dispersion process is then performed at a rotational speed of 10,000 rpm to 25,000 rpm for 10 minutes to 20 minutes by the jet stream.

As a result of the above-described process in step 1, the first dispersed solution is prepared in which the above-described conductive agent and dispersant are uniformly dispersed in the solvent.

(Step 2)

In the method of preparing a composition for forming a positive electrode of a lithium secondary battery according to the embodiment of the present invention, step 2 is a step of adding binder powder to the first dispersed solution prepared in step 1 and performing dispersion.

The binder improves the adhesion between the positive electrode active material particles and the adhesion between the positive electrode active material and the current collector, and any binder may be used without particular limitation as long as it is typically used in a composition for forming a positive electrode. Among these binders, in consideration of the effect of the improvement in the battery characteristics, specific examples of the binder may be a fluorinated polymer (e.g., polyvinylidene fluoride (PVDF), polytetrafluoroethylene, or polyhexafluoropropylene), a polyalkylene-based polymer (e.g., polyethylene or polypropylene), a poly(meth)acrylate-based polymer (e.g., polymethylmethacrylate or polyacrylate), or various rubbers (e.g., styrene-butadiene rubber or fluorine rubber), and any one thereof or a mixture of two or more thereof may be used. For example, the binder may be a fluorinated polymer binder such as polyvinylidene fluoride, polytetrafluoroethylene, or polyhexafluoropropylene.

Also, in a case in which the binder is the fluorinated polymer binder, the fluorinated polymer may include at least one functional group capable of hydrogen bonding with a hydroxyl group on the surface of the positive electrode active material in a molecule, specifically, a carboxyl group, a hydroxyl group, an ester group (—COOR, where R is a hydrocarbon group having 1 to 20 carbon atoms, for example, an alkyl group having 1 to 20 carbon atoms, or a cycloalkyl group having 3 to 20 carbon atoms), a sulfonic acid group, or a glycidyl group.

The functional groups included in the binder may improve adhesiveness by forming hydrogen bonds with the hydroxyl groups present on the surface of the current collector or the surface of the positive electrode active material, may simultaneously form a lithium-ion selective permeable film on the surface of the positive electrode active material, and may suppress the formation of a lithium compound which is synthesized by a reaction between the electrolyte solution and lithium ions on the surface of the positive electrode active material during first discharge. Accordingly, since the amount of the thermally unstable lithium compound may be small even if the temperature in the battery is increased due to a short circuit, exothermic decomposition may be suppressed and the direct reaction between the electrolyte solution and the lithium ions in the active material may be suppressed.

FIG. 1 is a schematic view illustrating a bond between the binder and the active material. FIG. 1 is only an example for describing the present invention, and the present invention is not limited thereto.

In FIG. 1, (a) denotes the positive electrode active material, and (b) denotes the fluorinated polymer binder. Referring to FIG. 1, although a conventional fluorinated binder may also form a hydrogen bond with a hydroxyl group on the surface of the active material, the formation of the hydrogen bond with the surface of the active material is more increased when the fluorinated binder includes an acid-derived functional group, particularly, a carboxyl group, and the formation of the hydrogen bond with the surface of the active material is further increased as the amount of the functional group is increased, for example, an ester group is added.

Among the exemplified hydrogen-bonding functional groups, in consideration of significant effects of improvement in the dispersibility of the binder and consequent improvement in the adhesion, the functional group may be at least one selected from the group consisting of a hydroxyl group, a carboxyl group, and an ester group, and, for example, the fluorinated polymer may include two or more functional groups thereof.

The fluorinated polymer including the hydrogen-bonding functional group may be prepared by a method, in which the hydrogen-bonding functional group is substituted by using a known chemical reaction or the fluorinated polymer is polymerized by using a monomer including the hydrogen-bonding functional group, or may be commercially obtained.

Specifically, the fluorinated polymer may include the above-described functional group in the polymer in an amount of 0.1 mol % to 1 mol %, and, in consideration of the significant effects of the improvement in the dispersibility of the binder and the consequent improvement in the adhesion due to the control of the amount of the functional group in the fluorinated polymer, the fluorinated polymer may include the above-described functional group in an amount of 0.15 mol % to 0.7 mol %, for example, 0.17 mol % to 0.6 mol %.

Also, since the binder is a polymer, the adhesiveness and dispersibility may be changed according to its weight-average molecular weight. In consideration of the adhesion of the binder itself and the uniform dispersion of the binder in the electrode, the binder may have a weight-average molecular weight of 200 kg/mol to 1,000 kg/mol. In a case in which the weight-average molecular weight of the binder is less than 200 kg/mol, the adhesion may be reduced, and, in a case in which the weight-average molecular weight of the binder is greater than 1,000 kg/mol, the dispersibility of the binder may be reduced. In order to obtain a good balance between the adhesion and the dispersibility due to the control of the weight-average molecular weight of the binder, the weight-average molecular weight of the binder may be in a range of 600 kg/mol to 900 kg/mol, for example, 630 kg/mol to 880 kg/mol.

In the present invention, the weight-average molecular weight of the binder is a polystyrene-equivalent molecular weight analyzed by gel permeation chromatography (GPC).

Specifically, the binder may be a fluorinated polymer, which includes the hydrogen-bonding functional group in the molecule in an amount of 0.1 mol % to 1 mol % and has a weight-average molecular weight of 200 kg/mol to 1,000 kg/mol, and may be a fluorinated polymer which includes the hydrogen-bonding functional group in the molecule in an amount of 0.15 mol % to 0.7 mol %, for example, 0.17 mol % to 0.6 mol %, and has a weight-average molecular weight of 600 kg/mol to 900 kg/mol, for example, 630 kg/mol to 880 kg/mol.

Also, the binder is in the form of power, wherein the shape thereof is not particularly limited and may specifically be a spherical shape, fibrous shape, plate shape, or polygonal shape.

Furthermore, the binder is used in the form of powder, and, in this case, an average particle diameter ($D_{50}$) of the binder may be in a range of 0.3 μm to 0.7 μm. In a case in which the average particle diameter is less than 0.3 μm, the dispersibility may be reduced due to the agglomeration of the binder itself, and, in a case in which the average particle diameter is greater than 0.7 μm, the uniform dispersion in the composition may be difficult. In consideration of the significant effect of the improvement in the battery characteristics due to the control of the average particle diameter of the binder, the average particle diameter of the binder may be in a range of 0.5 μm to 0.7 μm. Also, in the present invention, the average particle diameter ($D_{50}$) of the binder may be defined as a particle diameter at 50% in a cumulative particle diameter distribution, and may be measured by using a laser diffraction method similar to the above-described measurement of the average particle diameter of the conductive agent.

The binder may be included in an amount of 1 part by weight to 30 parts by weight based on 100 parts by weight of the positive electrode active material. In a case in which the amount of the binder is less than 1 part by weight, the adhesion required in the electrode may not be obtained, and, in a case in which the amount of the binder is greater than 30 parts by weight, capacity characteristics of the battery may be reduced. Specifically, the binder may be included in an amount of 10 parts by weight to 20 parts by weight based on 100 parts by weight of the positive electrode active material.

In step 2, the binder powder is added to the first dispersed solution, and a solvent may then be selectively further added to increase the dispersibility of the binder and adjust the viscosity of the finally prepared composition for forming a positive electrode before the implementation of the secondary dispersion process. In this case, the solvent is the same as that described in step 1 and may be added in an amount such that the finally prepared composition for forming a positive electrode has an appropriate viscosity, for example, a viscosity of 1,000 cps to 5,000 cps, in consideration of the amount of the solvent used in step 1.

Also, in step 2, a method of dispersing after the addition of the binder powder and the selective further addition of the solvent may be performed according to a typical mixing or dispersion method. Specifically, the method may be performed by using a mixing or dispersing apparatus such as a homogenizer, bead mill, ball mill, basket mill, attrition mill, universal stirrer, clear mixer, or TK mixer. For example, the secondary dispersion in step 2 may be performed at a rotational speed of 1,000 rpm to 5,000 rpm for 30 minutes to 1 hour.

As a result of the above-described process in step 2, the second dispersed solution is prepared in which the conductive agent, the dispersant, and the binder are uniformly dispersed in the solvent.

In a case in which the active material, the conductive agent, and the binder are added at a time and mixed as in the preparation of a conventional composition for forming a positive electrode, a solid content may increase to reduce the dispersibility of the conductive agent and the binder, and as a result, agglomeration may occur. However, in a case in which the binder is mixed with the first dispersed solution including the conductive agent and dispersed in advance before the mixing of the positive electrode active material as described above, since the solid content and the viscosity are low, the dispersibility of the binder may be further increased. As a result, the uniform dispersion of the binder in the electrode may be possible, and thus, the adhesion between the active material particles and the adhesion between the active material and the electrode current collector are improved and performance, such as lifetime characteristics, of the battery may be further improved.

(Step 3)

In the method of preparing a composition for forming a positive electrode of a lithium secondary battery according to the embodiment of the present invention, step 3 is a step of adding the positive electrode active material to the second dispersed solution prepared in step 2 to prepare the composition for forming a positive electrode.

In step 3, the positive electrode active material may be a compound (lithiated intercalation compound) capable of reversibly intercalating and deintercalating lithium, and may specifically be a composite metal oxide of lithium and cobalt, manganese, nickel, or a combined metal thereof. For example, the positive electrode active material may include lithium-manganese-based oxide (e.g., $LiMnO_2$ or $LiMn_2O$), lithium-cobalt-based oxide (e.g., $LiCoO_2$), lithium-nickel-based oxide (e.g., $LiNiO_2$), lithium-nickel-manganese-based oxide (e.g., $LiNi_{1-Y}Mn_YO_2$ (where 0<Y<1), $LiMn_{2-Z}Ni_ZO_4$ (where 0<Z<2)), lithium-nickel-cobalt-based oxide (e.g., $LiNi_{1-Y}Co_YO_2$ (where 0<Y<1)), lithium-manganese-cobalt-based oxide (e.g., $LiCo_{1-Y}Mn_YO_2$ (where 0<Y<1)), $LiMn_{2-Z}Co_ZO_4$ (where 0<Z<2)), lithium-nickel-manganese-cobalt-based oxide (e.g., $Li(Ni_PCo_QMn_R)O_2$ (where 0<P<1, 0<Q<1, 0<R<1, P+Q+R=1) or $Li(Ni_PCo_QMn_R)O_4$ (where 0<P<2, 0<Q<2, 0<R<2, P+Q+R=2), or lithium-nickel-cobalt-manganese-transition metal (M) oxide (e.g., $Li(Ni_PCo_Q Mn_RM_S)O_2$ (where M is selected from the group consisting of aluminum (Al), iron (Fe), vanadium (V), chromium (Cr), titanium (Ti), tantalum (Ta), magnesium (Mg), and molybdenum (Mo), and P, Q, R, and S represent an atomic fraction of each independent element, wherein 0<P<1, 0<Q<1, 0<R<1, 0<S<1, and P+Q+R+S=1), and any one thereof or a mixture of two or more thereof may be used.

Among these positive electrode active materials, in terms of increasing the capacity characteristics and stability of the battery, the positive electrode active material, for example, may include $LiCoO_2$, $LiMnO_2$, lithium nickel manganese cobalt oxide (e.g., $Li(Ni_{0.6}Mn_{0.2}Co_{0.2})O_2$, $LiNi_{0.5}Mn_{0.3}CO_{0.2}O_2$, or $LiNi_{0.8}Mn_{0.1}Co_{0.1}O_2$), or lithium nickel cobalt aluminum oxide (e.g., $LiNi_{0.8}Co_{0.15}Al_{0.05}O_2$).

Also, in the lithium composite metal oxide, at least one of metal elements excluding lithium may be doped with at least one element selected from the group consisting of tungsten (W), Mo, zirconium (Zr), Ti, Mg, Ta, Al, Fe, V, Cr, barium (Ba), calcium (Ca), and niobium (Nb). Thus, in a case in which the lithium-defected lithium composite metal oxide is further doped with the above-described metal element, structural stability of the positive electrode active material is improved, and, as a result, the output characteristics of the battery may be improved. In this case, the amount of the doping element included in the lithium composite metal oxide may be appropriately adjusted within a range that does not deteriorate characteristics of the positive electrode active material and, for example, may be 0.02 at % or less.

Furthermore, the positive electrode active material may have an average particle diameter ($D_{50}$) of 1 μm to 20 μm. In a case in which the average particle diameter of the positive electrode active material is less than 1 μm, dispersibility in the positive electrode material mixture may be reduced due to the agglomeration of the positive electrode active material, and, in a case in which the average particle diameter is greater than 20 µm, mechanical strength and specific surface area of the positive electrode active material may be reduced. In consideration of a significant effect of improvement in rate capability and initial capacity characteristics of the battery due to the control of the particle diameter of the positive electrode active material, the positive electrode active material may have an average particle diameter ($D_{50}$) of 1 µm to 15 µm. In the present invention, the average particle diameter ($D_{50}$) of the positive electrode active material may be defined as a particle diameter at 50% in a cumulative particle diameter distribution and may be measured by using the same method as the above-described method of measuring the average particle diameter of the conductive agent.

Also, on the basis of the solid content, the positive electrode active material may be included in an amount of 70 wt % to 98 wt % based on a total weight of the composition for forming a positive electrode. In a case in which the amount of the positive electrode active material is less than 70 wt %, capacity may be reduced, and, in a case in which the amount of the positive electrode active material is greater than 98 wt %, since the relative amount of the binder and the conductive agent may be reduced, the adhesion to the positive electrode collector and the conductivity may be reduced.

A mixing and dispersion process after the addition of the positive electrode active material may be performed in the same manner as in step 2. Specifically, the process may be performed by using a mixing or dispersing apparatus such as a homogenizer, bead mill, ball mill, basket mill, attrition mill, universal stirrer, clear mixer, or TK mixer. For example, the dispersion may be performed at a rotational speed of 1,000 rpm to 5,000 rpm for 30 minutes to 1 hour.

Also, in the method of preparing a composition for forming a positive electrode of a lithium secondary battery according to the embodiment of the present invention, a conventional additive, specifically, a filler or a surfactant, may be further added to the first dispersed solution in step or the composition for forming a positive electrode obtained as a result of step 3 within a range that does not impair the effect of the present invention.

In the preparation method of the present invention as above-described, the binder powder is used, but since the binder and the positive electrode active material are sequentially mixed after the conductive agent and the dispersant are first dispersed, the components in the composition may be more uniformly dispersed to reduce the internal resistance of the battery and improve the output characteristics. Also, since the binder powder uniformly dispersed in the positive electrode active material layer is in point contact with the positive electrode active material and the conductive agent, a limitation, in which when a conventional liquid binder is used, the binder deteriorates battery characteristics by surrounding the positive electrode active material and the conductive agent to prevent a contact with the electrolyte solution, may not occur.

Thus, according to another embodiment of the present invention, provided is a composition for forming a positive electrode of a lithium secondary battery which is prepared by the above-described preparation method.

Specifically, the composition for forming a positive electrode includes a positive electrode active material, a conductive agent, binder powder, and a dispersant which are uniformly dispersed in a solvent. Types and amounts of the positive electrode active material, the conductive agent, the binder powder, and the dispersant are the same as those previously described.

Also, viscosity of the composition for forming a positive electrode may be in a range of 1,000 cps to 5,000 cps. In a case in which the viscosity of the composition for forming a positive electrode is less than 1,000 cps or greater than 5,000 cps, since the coatability is reduced, a positive electrode active material layer having a uniform thickness may be difficult to be formed.

According to another embodiment of the present invention, provided is a positive electrode for a lithium secondary battery which is prepared by using the composition for forming a positive electrode.

Specifically, the positive electrode includes a positive electrode collector and a positive electrode active material layer on the positive electrode collector, and the positive electrode active material layer may be prepared by using the above-described composition for forming a positive electrode. Specifically, the positive electrode active material layer includes the above-described positive electrode active material, conductive agent, binder powder, and dispersant which are uniformly dispersed in the active material layer, and the binder powder is in point contact with the positive electrode active material and the conductive agent. Also, in a case in which the binder further includes a functional group capable of hydrogen bonding with a hydroxyl group on the surface of the positive electrode active material, the binder and the surface of the positive electrode active material may be hydrogen bonded.

For example, in the positive electrode, any positive electrode collector may be used without particular limitation as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may have a thickness of 3 µm to 500 µm and may have a microscopic uneven surface to improve the adhesion of the positive electrode active material. The positive electrode collector, for example, may be used in various shapes such as that of a film, a sheet, a foil, a net, a porous body, a foam body, a non-woven fabric body, and the like.

Also, in the positive electrode, the positive electrode active material layer may be prepared according to a typical method of preparing a positive electrode except that the composition for forming a positive electrode prepared by the above-described preparation method is used. Specifically, the composition for forming a positive electrode is coated on the positive electrode collector, and the positive electrode active material layer may then be prepared by drying and rolling the positive electrode collector. In this case, coating, drying, and rolling processes of the composition for forming a positive electrode for the positive electrode collector may be performed by a typical method.

The coating process of the composition for forming a positive electrode may be specifically performed by coating one surface of the positive electrode collector using a typical slurry coating method such as bar coating, spin coating, roll coating, slot die coating, or spray coating. In this case, the coating may be performed by a single method or may be performed in combination of two or more methods. Also, when coating with the composition for forming a positive electrode, the composition for forming a positive electrode may be coated to an appropriate thickness in consideration of the amount and thickness of the active material loaded in the finally prepared positive electrode active material layer.

Thereafter, the drying process is performed on the coating layer of the composition for forming a positive electrode which is formed on the positive electrode collector.

In this case, the drying process may be performed by a method, such as a heat treatment or hot-air injection, at a temperature in which moisture included in the positive electrode is removed as much as possible along with the evaporation of the solvent in the composition for forming a positive electrode and a binding force of the binder may be increased at the same time. Specifically, the drying process may be performed at a temperature above a boiling point of the solvent and below a melting point of the binder, for example, at a temperature of 100° C. to 150° C. The drying process, for example, may be performed at a temperature of 100° C. to 120° C. and a pressure of 10 torr or less for 1 hour to 50 hours.

Also, the rolling process after the drying process may be performed by a typical method.

Furthermore, as another method, the positive electrode may be prepared by peeling off a film for forming a positive electrode, which is prepared by coating and drying the above-described composition for forming a positive electrode on a separate support, from the support and laminating the film on the positive electrode collector.

When used in the battery, the positive electrode prepared by the above-described method may reduce the internal resistance and may improve the output characteristics due to the uniform dispersion of the composition for forming a positive electrode. Also, since the binder powder is in point contact with the positive electrode active material and the conductive agent, the contact between the electrolyte solution and the positive electrode active material and conductive agent may be promoted.

Thus, according to another embodiment of the present invention, a lithium secondary battery including the positive electrode is provided.

Specifically, the lithium secondary battery includes the above-described positive electrode, a negative electrode, a separator disposed between the negative electrode and the positive electrode, and a non-aqueous electrolyte.

In the lithium secondary battery, the negative electrode includes a negative electrode collector and a negative electrode active material layer formed on the negative electrode collector.

In the negative electrode, any negative electrode collector may be used without particular limitation as long as it has high conductivity without causing adverse chemical changes in the battery, and, specifically, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may have various shapes and may specifically have a shape such as that of a film, a sheet, a foil, a net, a porous body, a foam body, a non-woven fabric body, and the like. Furthermore, the negative electrode collector may have a thickness of 3 µm to 500 µm, and microscopic irregularities or a pattern may be formed on the surface of the collector to improve the adhesion of the negative electrode active material.

Also, in the negative electrode, the negative electrode active material layer may be prepared by coating and drying a composition for forming a negative electrode which is prepared by dissolving and dispersing a negative electrode active material, a binder, and a conductive agent in a solvent.

In this case, a compound capable of reversibly intercalating and deintercalating lithium may be used as the negative electrode active material. Specific examples of the negative electrode active material may be a carbonaceous material such as artificial graphite, natural graphite, graphitized carbon fibers, or amorphous carbon; a metallic compound alloyable with lithium such as silicon (Si), Al, tin (Sn), lead (Pb), zinc (Zn), bismuth (Bi), indium (In), Mg, gallium (Ga), cadmium (Cd), a Si alloy, a Sn alloy, or an Al alloy; or a composite including the metallic compound and the carbonaceous material, and any one thereof or a mixture of two or more thereof may be used. Also, a lithium metal thin film may be used as the negative electrode active material.

Furthermore, the binder improves adhesion between negative electrode active material particles and adhesion between the negative electrode active material and the negative electrode collector. Specific examples of the binder may be polyvinylidene fluoride (PVDF), polyvinyl alcohol, starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber (SBR), a fluoro rubber, or various copolymers thereof, and any one thereof or a mixture of two or more thereof may be used. Among these binders, in consideration of a significant effect of the improvement, the binder may be an aqueous binder, and, in consideration of a significant adhesive effect due to the use of the binder, adhesion ability of the binder itself, and a high-temperature drying process in the preparation process of the negative electrode, the binder, for example, may be a styrene-butadiene rubber. Also, the binder may be included in an amount of 10 wt % to 30 wt % based on a total weight of the negative electrode active material layer.

Also, the conductive agent is the same as that previously described in the composition for forming a positive electrode and may be included in an amount of 1 wt % to 15 wt % based on the total weight of the negative electrode active material layer. In a case in which the amount of the conductive agent is less than 1 wt %, since the amount of the conductive agent is excessively small, the performance of the battery may be degraded due to an increase in the internal resistance of the electrode. In a case in which the amount of the conductive agent is greater than 15 wt %, since the amount of the binder may also be increased as the amount of the conductive agent is increased, a decrease in the battery capacity may occur due to a decrease in the electrode active material.

The solvent may be a solvent typically used in the art. The solvent may include dimethyl sulfoxide (DMSO), isopropyl alcohol, N-methylpyrrolidone (NMP), acetone, or water, and any one thereof or a mixture of two or more thereof may be used.

Also, the composition for forming a negative electrode may further include a thickener with the above-described components. Specifically, the thickener may be a cellulose-based compound such as carboxymethyl cellulose (CMC). The thickener may be included in an amount of 1 wt % to 10 wt % based on the total weight of the negative electrode active material layer.

The composition for forming a negative electrode having the above-described configuration may be coated on one surface of the negative electrode collector using a typical slurry coating method. Examples of the slurry coating method may be bar coating, spin coating, roll coating, slot die coating, or spray coating, and the coating may be performed by any one method thereof or may be performed by combining two or more methods thereof. Also, when coating with the composition for forming a negative electrode, the composition for forming a negative electrode may be coated to an appropriate thickness in consideration of the amount and thickness of the negative electrode active material loaded in the finally prepared negative electrode active material layer.

Thereafter, a drying process may be performed on the coating layer of the composition for forming a negative electrode which is formed on the negative electrode collector. In this case, the drying process may be performed by a method, such as a heat treatment or hot-air injection, at a temperature in which moisture included in the negative electrode is removed as much as possible along with the evaporation of the solvent in the negative electrode material mixture and a binding force of the binder may be increased at the same time. Specifically, the drying process may be performed at a temperature above a boiling point of the solvent and below a melting point of the binder, for example, at a temperature of 100° C. to 150° C. The drying process, for example, may be performed at a temperature of 100° C. to 120° C. and a pressure of 10 torr or less for 1 hour to 50 hours.

Also, a rolling process after the drying process may be performed by a typical method.

Furthermore, as another method, the above-described composition for forming a negative electrode is coated on a separate support an then dried to prepare a film, and the negative electrode may be prepared by peeling off the film from the support, laminating the film on the negative electrode collector, and rolling the collector. In this case, the composition for forming a negative electrode, the negative electrode collector, the coating process, the drying process, and the rolling process are the same as those described above.

In the lithium secondary battery, any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used.

The electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation as long as it may function as a medium through which ions involved in an electrochemical reaction of the battery may move. Specifically, the organic solvent may include an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), or propylene carbonate (PC), and any one thereof or a mixture of two or more thereof may be used. Among these organic solvents, the organic solvent may be the carbonate-based solvent, and, for example, may be a mixture of cyclic carbonate (e.g., ethylene carbonate or propylene carbonate) having high ionic conductivity and high dielectric constant, which may increase charge and discharge performance of the battery, and a low-viscosity linear carbonate-based compound (e.g., ethylmethyl carbonate, dimethyl carbonate, or diethyl carbonate).

Also, as the lithium salt, any lithium salt may be used without particular limitation as long as it is a compound used in a lithium secondary battery and capable of providing lithium ions. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$ may be used as the lithium salt, and any one thereof or a mixture of two or more thereof may be used. The lithium salt may be included in a concentration of 0.6 mol % to 2 mol % in the electrolyte.

At least one additive, for example, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further included in the electrolyte in addition to the above-described electrolyte components for the purpose of improving the lifetime characteristics of the battery, preventing a decrease in the battery capacity, and improving the discharge capacity of the battery. In this case, the additive may be included in an amount of 0.1 wt % to 5 wt % based on a total weight of the electrolyte.

The lithium secondary battery having the above-described configuration may be manufactured by preparing an electrode assembly by disposing the separator between the positive electrode and the negative electrode, disposing the electrode assembly in a case, and then injecting the electrolyte into the case.

As described above, since the lithium secondary battery, which includes the positive electrode prepared using the composition for forming a positive electrode according to the present invention, stably exhibits excellent discharge capacity, output characteristics, and capacity retention ratio, the lithium secondary battery is suitable for portable devices, such as mobile phones, notebook computers, and digital cameras, and electric cars such as hybrid electric vehicles.

Thus, according to another embodiment of the present invention, a battery module including the lithium secondary battery as a unit cell and a battery pack including the battery module are provided.

The battery module or the battery pack may be used as a power source of any one of medium and large sized devices, for example, a power tool; electric cars including an electric vehicle (EV), a hybrid electric vehicle (HEV), and a plug-in hybrid electric vehicle (PHEV); or a power storage system.

Hereinafter, exemplary embodiments will be described in detail to fully explain the present invention in such a manner that it may easily be carried out by a person with ordinary skill in the art to which the present invention pertains.

However, the present invention may be modified in various forms and is not limited to the disclosed embodiments.

Preparation Example 1: Preparation of Composition for Forming Positive Electrode 20 parts by weight of a carbon nanotube conductive agent (average particle diameter ($D_{50}$): 30 nm, specific surface area: 300 m$^2$/g, aspect ratio: 1.2) and 10 parts by weight of a carboxymethyl cellulose (CMC) dispersant ($M_w$: 2,500,000 g/mol) were mixed and dispersed in an N-methylpyrrolidone (NMP) solvent (90 vol % of the amount of solvent used during the preparation of a composition for forming a positive electrode) at 2,500 rpm for 30 minutes using a homo disperser (TK mixer). Thereafter, a mixing process, which was conducted at 15,000 rpm for 5 minutes using a clear mixer, was further performed 4 times to prepare a first dispersed solution. 20 parts by weight of PVdF binder powder (weight-average molecular weight ($M_w$)=880 kg/mol, average particle diameter ($D_{50}$) 0.5 μm) including a carboxyl group in the molecule in an amount of 1 mol % was added to the resultant first dispersed solution, and a second dispersed solution was then prepared by further adding and mixing the remaining amount of the NMP solvent at 2,500 rpm for 1 hour at 25° C. using a homo mixer. 100 parts by weight of a Li(Ni$_{0.6}$Mn$_{0.2}$CO$_{0.2}$)O$_2$ positive electrode active material (average particle diameter ($D_{50}$) 50 nm) was added to the second dispersed solution and then mixed at 2,500 rpm for 1 hour using a homo disperser to prepare a composition for forming a positive electrode (viscosity: 1,500 cps). An amount of each component used in the preparation of the composition for forming a positive electrode was a relative value represented based on 100 parts by weight of the amount of the positive electrode active material used.

Preparation Example 2: Preparation of Composition for Forming Positive Electrode A composition for forming a positive electrode was prepared in the same manner as in Example 1 except that PVdF binder powder (weight-average molecular weight ($M_w$)=880 kg/mol, average particle diameter ($D_{50}$) 0.5 μm), which did not include a hydrogen-bonding functional group in the molecule, was used as a binder.

Examples 1 and 2: Manufacture of Lithium Secondary Battery

Lithium secondary batteries of Example 1 and 2 were manufactured by respectively using the compositions for forming a positive electrode which were prepared in Preparation Examples 1 and 2.

Specifically, a copper (Cu) foil was coated with the compositions for forming a positive electrode which were respectively prepared in Preparation Examples 1 and 2, and the coated Cu foil was then dried by a heat treatment at 150° C. and rolled to prepare a positive electrode.

Also, artificial graphite, a carbon black conductive agent, CMC, and a SBR binder were mixed in an N-methylpyrrolidone solvent at a weight ratio of 96:1:2:1 to prepare a composition for forming a negative electrode (viscosity: 5,000 mPa·s), an aluminum current collector was coated with the composition, and the coated current collector was then dried and rolled to prepare a negative electrode.

A lithium secondary battery was manufactured by preparing an electrode assembly by disposing a porous polyethylene separator between the positive electrode and the negative electrode prepared above, disposing the electrode assembly in a case, and then injecting an electrolyte solution into the case. In this case, the electrolyte solution was prepared by dissolving 1.15 M lithium hexafluorophosphate (LiPF$_6$) in an organic solvent composed of ethylene carbonate/dimethyl carbonate/ethylmethyl carbonate (mixing volume ratio of EC/EMC/DEC=3/4/3).

Comparative Example: Manufacture of Lithium Secondary Battery 20 parts by weight of a carbon nanotube conductive agent (average particle diameter ($D_{50}$): 30 nm, specific surface area: 300 m$^2$/g, aspect ratio: 1.2) and 10 parts by weight of a CMC dispersant ($M_w$: 2,500,000 g/mol) were mixed with 20 parts by weight of a PVdF binder solution including a carboxyl group in the molecule, which was dissolved in an N-methylpyrrolidone (NMP) solvent, based on a solid content of the binder at 2,500 rpm for 30 minutes using a homo disperser. Thereafter, a mixing process, which was conducted at 15,000 rpm for 5 minutes using a clear mixer, was further performed 4 times to prepare a first dispersed solution. 100 parts by weight of a Li(Ni$_{0.6}$Mn$_{0.2}$CO$_{0.2}$)O$_2$ positive electrode active material was added to the resultant first dispersed solution and then mixed at 2,500 rpm for 1 hour at 25° C. using a homo disperser to prepare a composition for forming a positive electrode.

A lithium secondary battery was manufactured in the same manner as in the example except that the composition for forming a positive electrode prepared as described above was used.

Experimental Example 1

The positive electrodes prepared in the manufacturing process of the lithium secondary batteries of Example 1 and Comparative Example were processed by ion milling and cross-sectional structures of the positive electrode active material layers were observed by using a field emission scanning electron microscope (FE-SEM). The results thereof are presented in FIGS. 2A to 2C and 3A to 3C.

Figure 2A:
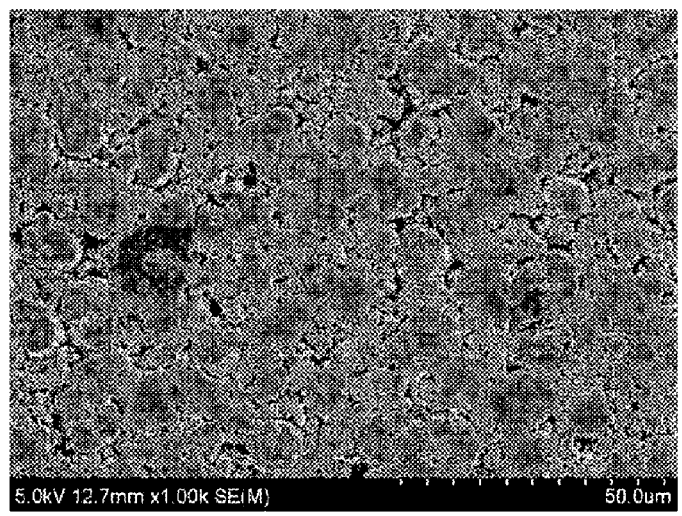
FIGS. 2A through 2C are field emission scanning electron microscope (FE-SEM) images of a positive electrode prepared in Comparative Example at various magnifications.
Figure 2B:
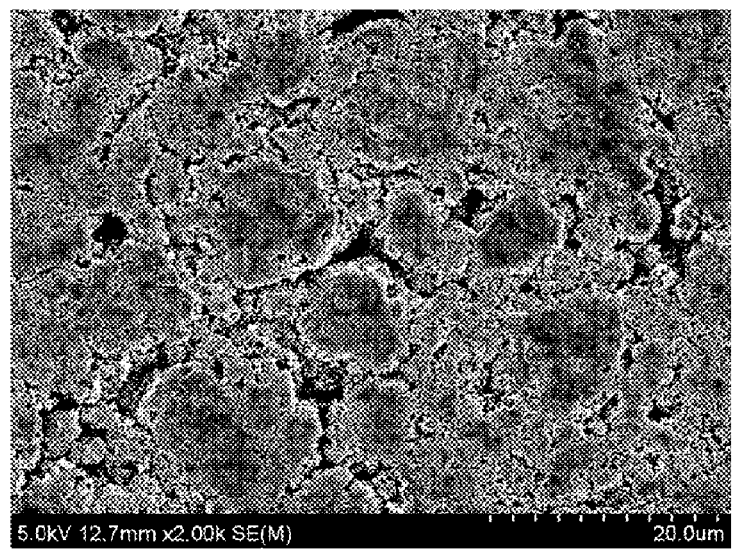
Figure 2C:
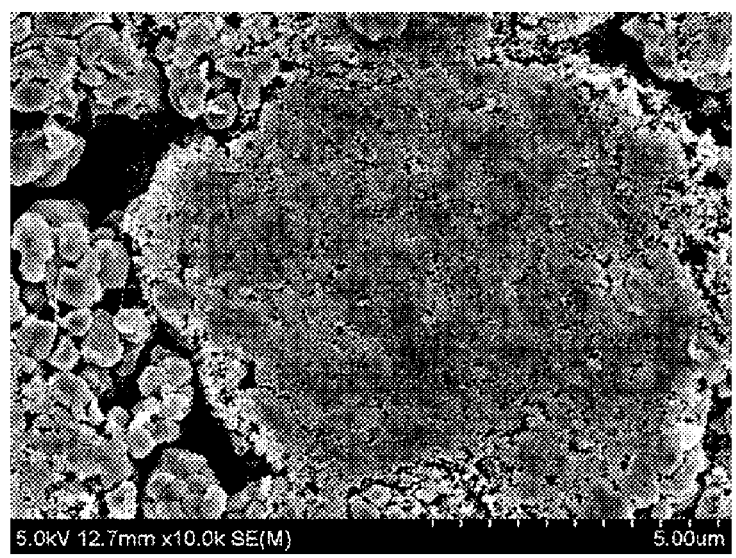
Figure 3A:
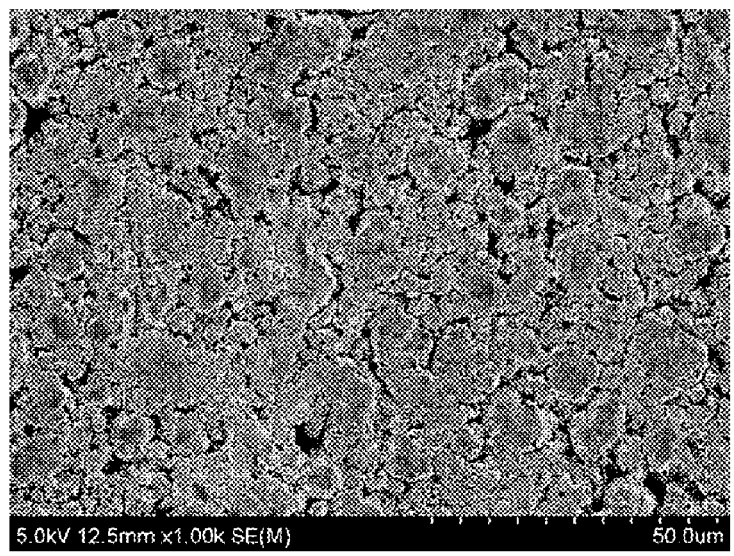
FIGS. 3A through 3C are FE-SEM images of a positive electrode prepared in Example 1 at various magnifications.
Figure 3B:
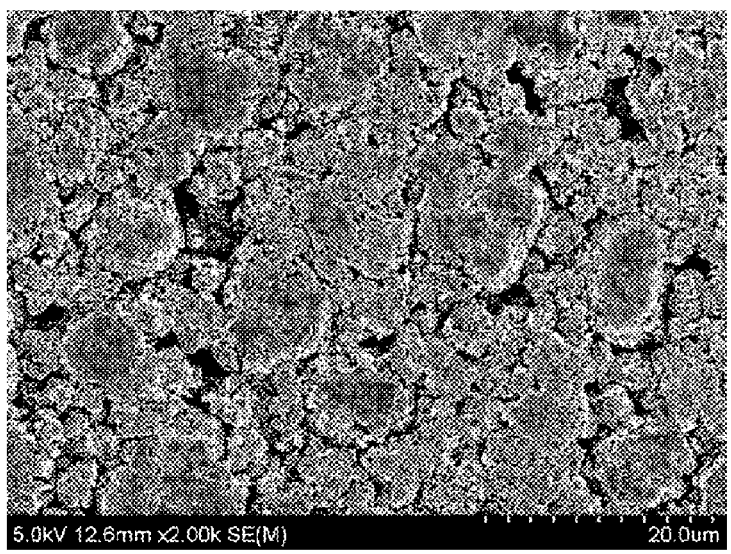
Figure 3C:
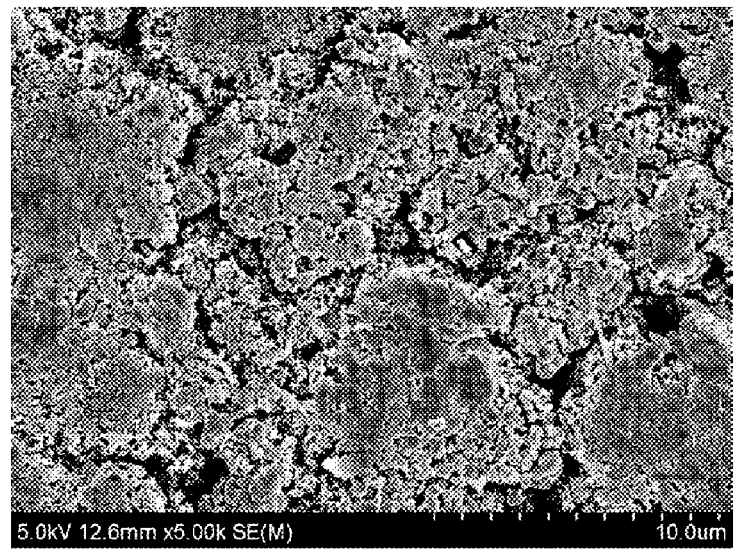

FIGS. 2A through 2C are FE-SEM images of the positive electrode of Comparative Example at various magnifications (magnification of FIG. 2A was one time, magnification of FIG. 2B was 2 times, and magnification of FIG. 2C was 5 times), and FIGS. 3A through 3C are FE-SEM images of the positive electrode of Example 1 (magnification of FIG. 3A was one time, magnification of FIG. 3B was 2 times, and magnification of FIG. 3C was 5 times).

As illustrated in FIGS. 2A to 2C and 3A to 3C, with respect to Comparative Example, numerous portions were found in which the components in the active material layer were partially agglomerated, but, with respect to Example 1, since such agglomeration was not found, it may be confirmed that the components were uniformly dispersed over the entire active material layer.

Also, with respect to Comparative Example, the binder surrounded the positive electrode active material or the surface of the conductive agent, but, with respect to Example 1, it may be confirmed that the binder powder was in point contact with the positive electrode active material and the conductive agent.

Experimental Example 2: Evaluation of Effect of Reducing Battery Resistance

The effect of reducing resistance of the lithium secondary batteries prepared in Example 1 and Comparative Example at room temperature (25° C.) and low temperature (10° C.) was evaluated.

Specifically, the lithium secondary batteries were charged/discharged at 1C/2C in a driving voltage of 2.8 V to 4.15 V at room temperature (25° C.), and the batteries charged and discharged at room temperature (25° C.) were then charged to each state of charge (SOC) (specifically, 100% SOC (solid) and 20% SOC (open)) to measure resistance. Also, the lithium secondary batteries were charged and discharged in the same manner at low temperature (10° C.), and resistance was then measured. The results thereof are presented in FIGS. 4 and 5.

Figure 4:
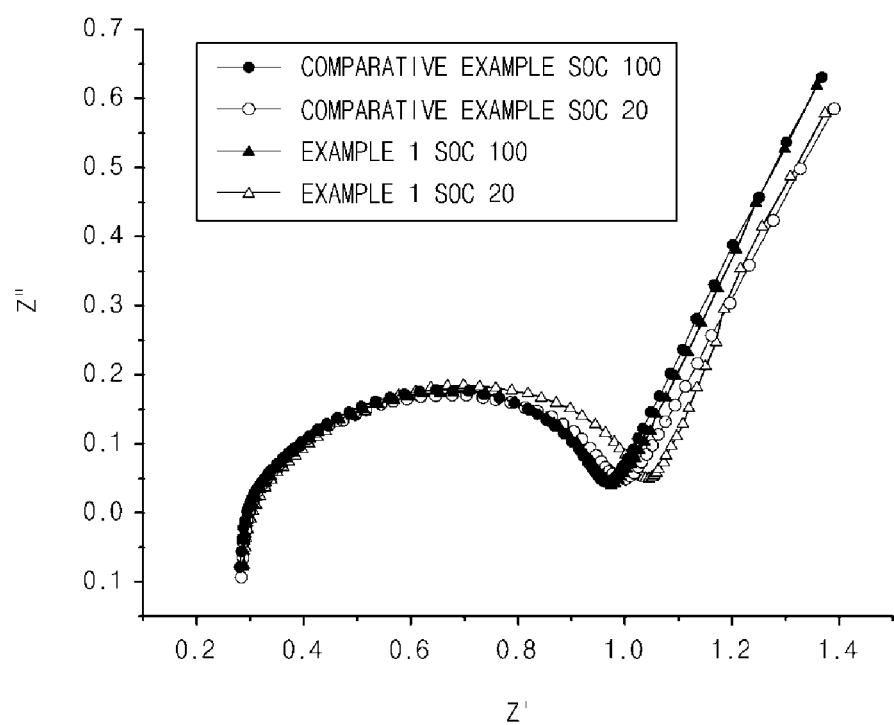
FIG. 4 is a graph illustrating the results of investigating an effect of reduction in resistance of lithium secondary batteries prepared in Example 1 and Comparative Example at room temperature (25° C.)
Figure 5:
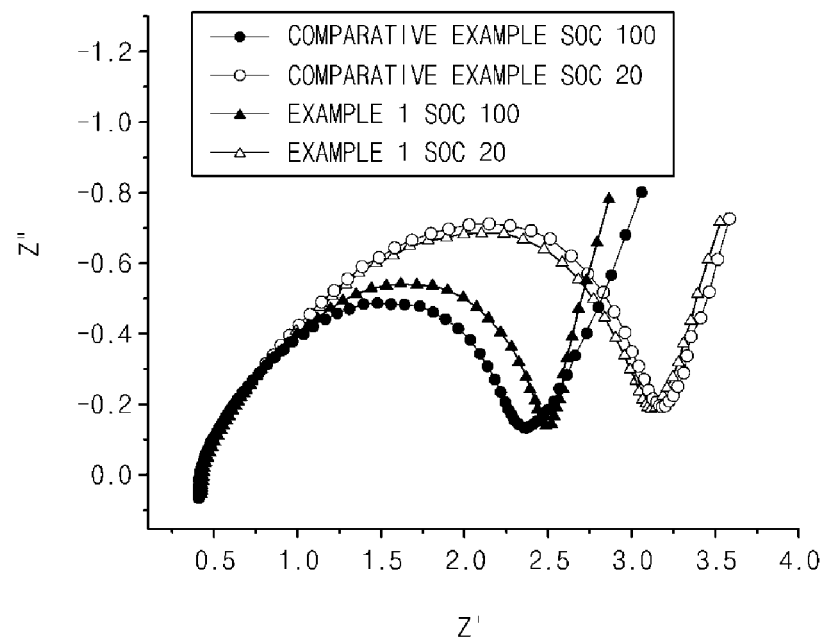
FIG. 5 is a graph illustrating the results of investigating an effect of reduction in resistance of lithium secondary batteries prepared in Example 1 and Comparative Example at low temperature (10° C.)

FIG. 4 is a graph illustrating the results of impedance measurement at room temperature (25° C.), and FIG. 5 is a graph illustrating the results of impedance measurement at low temperature (10° C.)

According to the experimental results, the battery of Example 1 exhibited an improvement effect in resistance characteristics at both room temperature and low temperature in comparison to the battery of Comparative Example, and had a significantly reduced resistance, particularly, at low temperature in comparison to Comparative Example. From the above results, it may be understood that the resistance characteristics of the battery were improved due to the uniform dispersion of the components in the positive electrode of Example 1.

Experimental Example 3: Evaluation of Adhesion and Sheet Resistance Characteristics Adhesion and sheet resistance were measured for the lithium secondary batteries prepared in Example 1 and Comparative Example.

Figure 6:
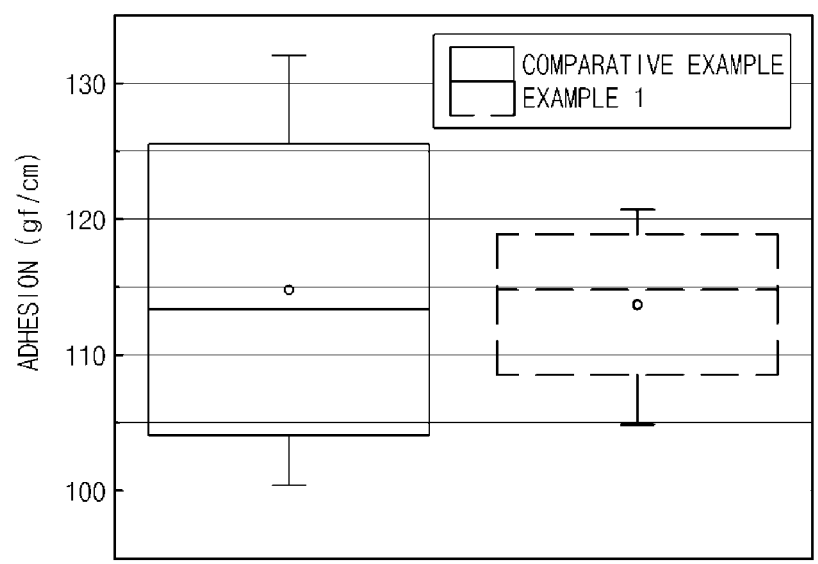
FIG. 6 is a graph illustrating the measurement results of adhesion of positive electrodes prepared in Example 1 and Comparative Example.

In the measurement of the adhesion, the positive electrodes prepared in Example 1 and Comparative Example were punched for top/back, lane, and left/center/right points in the same lane using an electrode punching machine (15 cm×1 cm), and each punched positive electrode was adhered to slide glass having a double-sided tape (product of 3M) attached thereto to prepare each sample. Next, the prepared samples were rubbed 13 to 15 times with a 2 kg roller so that the double-sided tape is uniformly adhered to the surface of the electrode. Thereafter, each prepared sample was installed in a grip of a universal testing machine (UTM, LF Plus by LlOYD Instruments) as an electrode adhesion measuring instrument, and adhesion was then measured with a load cell of 5 N (1 lbf). The results thereof are presented in FIG. 6.

Figure 7:
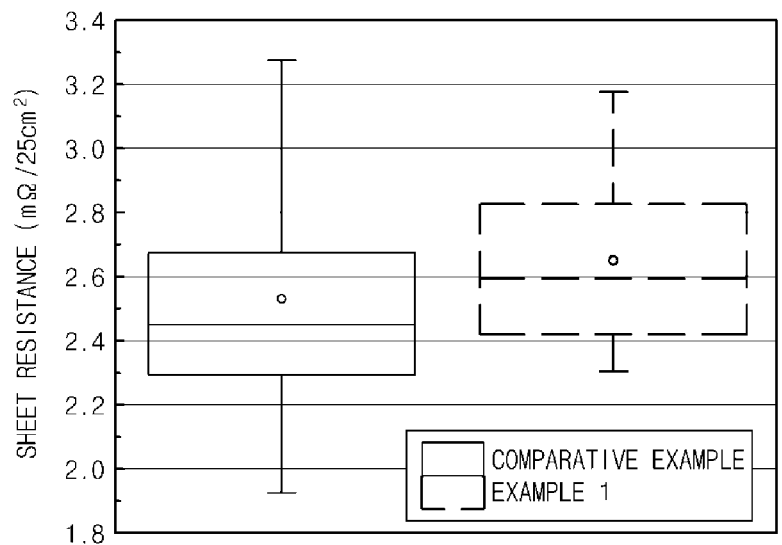
FIG. 7 is a graph illustrating the measurement results of sheet resistance of positive electrodes prepared in Example 1 and Comparative Example.

Also, the positive electrodes prepared in Example 1 and Comparative Example were cut to a size of 5 cm×5 cm, and sheet resistance was then measured using a sheet resistance measuring system (CMT-SR2000N, Advanced Instrument Technology Co., Ltd.). The results thereof are presented in FIG. 7.

According to the experimental results, Example 1 using the binder powder exhibited almost the same adhesion and sheet resistance levels as Comparative Example. From the above results, it may be understood that, since the method of mixing the components was optimized during the preparation of the composition for forming a positive electrode by using the binder powder to increase the dispersibility in the composition, the battery resistance may be reduced without a decrease in the adhesion and, as a result, the output characteristics were improved.

Experimental Example 4: Evaluation of Adhesion Depending on Binder

An effect of the improvement in the adhesion depending on the amount of the functional group and the molecular weight of the binder used in the preparation of the composition for forming a positive electrode according to the present invention was measured.

Specifically, compositions for forming a positive electrode were respectively prepared in the same manner as in Example 1 except that PVdF binders (average particle diameter ($D_{50}$)=0.5 μm) respectively having weight-average molecular weights and amounts of functional groups as listed in the following Table 1 were used. A Cu foil was coated with each prepared composition for forming a positive electrode, and the coated Cu foil was then dried by a heat treatment at 150° C. and rolled to prepare a positive electrode.

As in Experimental Example 3, a double-sided tape (product of 3M) was attached to slide glass, the prepared positive electrode was punched to a width of 1.5 cm using an electrode punching machine, and a surface having a positive electrode active material layer formed thereon was attached toward the double-sided tape and then reciprocally rubbed 10 times with a roller. Thereafter, adhesion was measured at an angle of 180 degrees)(° (measurement of primary adhesion by cohesion+adhesion). Subsequently, a 3M scotch tape was again attached to the remaining electrode remained on the double-sided tape on the slide glass and then rolled to measure adhesion (measurement of cohesion) while peeling off the scotch tape in the same manner as in the measurement of the primary adhesion. Also, cohesion for each thickness of the electrode was measured by a method in which a 3M scotch tape was attached and then peeled off in the same manner as described above.

Figure 8:
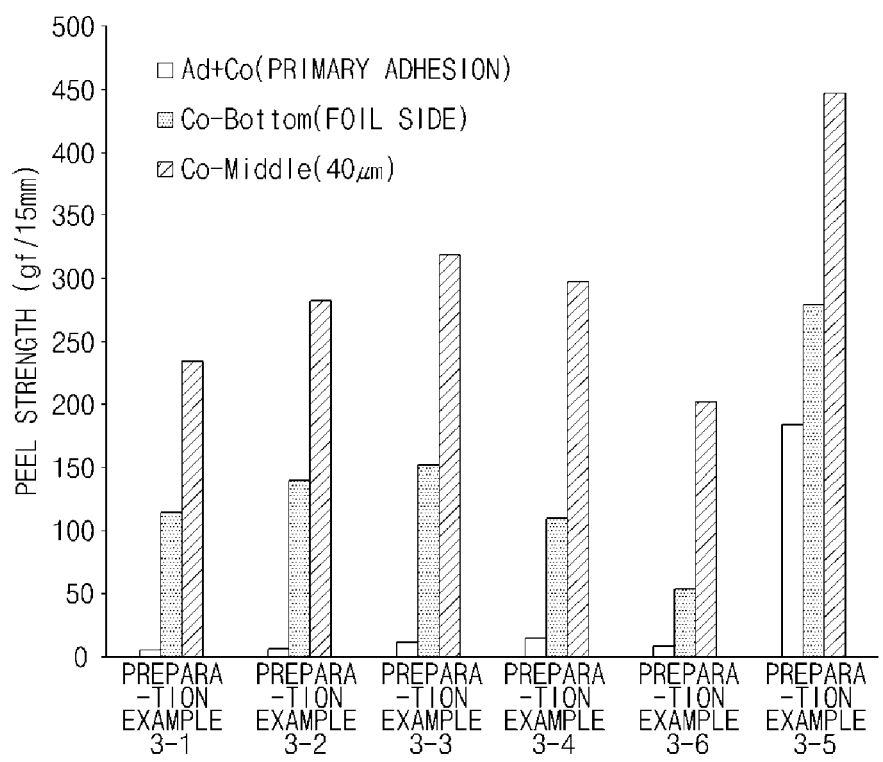
FIG. 8 is a graph illustrating adhesion between a binder and an active material depending on a position in positive electrodes prepared by using compositions for a positive electrode of Preparation Examples 3-1 to 3-6.

In the present experiment, the primary adhesion by cohesion+adhesion, peel strength (Co-Bottom (foil side)) to the positive electrode collector, and peel strength (Co-middle (40 μm)) at a positive electrode thickness of 40 μm (=height of 40 μm from the positive electrode collector) were respectively measured. The results thereof are presented in FIG. 8.

TABLE 1

| | Weight-average molecular weight of binder (kg/mol) | Amount of functional group (mol %) | |
| --- | --- | --- | --- |
| | | Carboxyl group | Ester group (—COOR, R = methyl group) |
| Preparation Example 3-1 | 280 | — | — |
| Preparation Example 3-2 | 280 | 0.17 | — |
| Preparation Example 3-3 | 280 | 0.3 | 0.3 |
| Preparation Example 3-4 | 630 | — | — |
| Preparation Example 3-5 | 880 | 0.3 | 0.3 |
| Preparation Example 3-6 | 1,000 | — | — |

According to the experimental results, when comparing Preparation Examples 3-1 to 3-3, in a case in which the functional group is included in the binder even if the binder had the same molecular weight, the adhesion was improved as the amount of the functional group was increased. Also, a degree of improvement in the adhesion was more significant in terms of the adhesion at the thickness center of the positive electrode in comparison to the primary adhesion and the adhesion to the positive electrode collector. These results were due to the fact that the binder was uniformly dispersed over the entire electrode because the functional group was included in the binder and the dispersibility of the binder was improved as the amount of the functional group was increased.

Also, when comparing Preparation Examples 3-1, 3-4, and 3-6, in a case in which the binder did not include the functional group, the adhesion was increased until the molecular weight of the binder was increased to a certain extent. However, in a case in which the molecular weight is greater than a certain level, the adhesion was reduced and the reduction range was more significant in terms of the adhesion at the thickness center of the positive electrode. Accordingly, it may be understood that the molecular weight of the binder affected the dispersibility of the binder and there existed an optimum molecular weight range in which excellent dispersibility was obtained.

Also, when Preparation Examples 3-2 and 3-3 were compared with Preparation Example 3-4, Preparation Examples 3-2 and 3-3, which included the functional group even if the weight-average molecular weight of the binder was smaller, exhibited better adhesion properties than Preparation Example 3-4.

Furthermore, when Preparation Examples 3-3 and 3-5 were compared, in a case in which the binder included the functional group, the adhesion was improved as the molecular weight of the binder was increased, and a degree of improvement in the adhesion between the active material particles and the adhesion at the thickness center of the positive electrode was particularly significant.

The best adhesion properties were obtained in Preparation Examples 3-5, which included the functional group and used the binder having a weight-average molecular weight of 880 kg/mol, among the measured positive electrodes. Thus, it may be understood that, when the functional group was included and the weight-average molecular weight was in a range of 630 kg/mol or more to less than 1,000 kg/mol, for example, 600 kg/mol to 900 kg/mol, better adhesion properties may be obtained.

The invention claimed is:

1. A method of preparing a composition for forming a positive electrode of a lithium secondary battery, the method comprising:
    preparing a first dispersed solution by primary dispersion of a conductive agent and a dispersant in a solvent;
    preparing a second dispersed solution by adding binder powder to the first dispersed solution and performing secondary dispersion; and
    adding and mixing a positive electrode active material to the second dispersed solution,
    wherein the binder comprises a fluorinated polymer having at least one hydrogen-bonding functional group selected from the group consisting of a carboxyl group, a hydroxyl group, an ester group, a sulfonic acid group, and a glycidyl group, and
    wherein the at least one hydrogen-bonding functional group is included in a molecule of the fluorinated polymer in an amount of 0.1 mol % to 1 mol %.

2. The method of claim 1, wherein an average particle diameter of the conductive agent is 60% to 80% of an average particle diameter of the positive electrode active material.

3. The method of claim 1, wherein the conductive agent has an aspect ratio of greater than 1.

4. The method of claim 1, wherein the conductive agent is included in an amount of 1 part by weight to 20 parts by weight based on 100 parts by weight of the positive electrode active material.

5. The method of claim 1, wherein the dispersant is a cellulose-based compound.

6. The method of claim 1, wherein the dispersant comprises carboxymethyl cellulose having a weight-average molecular weight of 2,000,000 g/mol to 3,000,000 g/mol.

7. The method of claim 1, wherein the dispersant is included in an amount of 0.1 part by weight to 10 parts by weight based on 100 parts by weight of the positive electrode active material.

8. The method of claim 1, wherein the primary dispersion comprises a multistage dispersion process, in which a first dispersion process is performed at a rotational speed of 1,000 rpm to 5,000 rpm and a second dispersion process is then performed at a rotational speed of 10,000 rpm to 25,000 rpm by jet stream.

9. The method of claim 1, wherein the binder comprises a fluorinated polymer.

10. The method of claim 1, wherein the binder comprises a fluorinated polymer having a weight-average molecular weight of 200 kg/mol to 1,000 kg/mol.

11. The method of claim 1, wherein an average particle diameter of the binder is in a range of 0.3 μm to 0.7 μm.

12. The method of claim 1, wherein the binder is included in an amount of 1 part by weight to 30 parts by weight based on 100 parts by weight of the positive electrode active material.

13. The method of claim 1, further comprising a process of further adding a solvent before the secondary dispersion after the addition of the binder powder.

14. A composition for forming a positive electrode of a lithium secondary battery which is prepared by the method of claim 1.

15. A positive electrode for a lithium secondary battery which is prepared by using the composition for forming a positive electrode of claim 14 and comprises a positive electrode active material, a conductive agent, binder powder, and a dispersant,
    wherein the binder powder is in point contact with the positive electrode active material and the conductive agent.

16. A lithium secondary battery comprising the positive electrode of claim 15.

* * * * *